(12) United States Patent
Harada et al.

(10) Patent No.: US 11,678,206 B2
(45) Date of Patent: Jun. 13, 2023

(54) TERMINAL, BASE STATION AND RADIO COMMUNICATION METHOD USING A PLURALITY OF SYNCHRONIZATION SIGNAL BLOCKS

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/476,197

(22) PCT Filed: Jan. 5, 2018

(86) PCT No.: PCT/JP2018/000057
§ 371 (c)(1),
(2) Date: Jul. 5, 2019

(87) PCT Pub. No.: WO2018/128187
PCT Pub. Date: Jul. 12, 2018

(65) Prior Publication Data
US 2020/0029229 A1    Jan. 23, 2020

(30) Foreign Application Priority Data

Jan. 6, 2017 (JP) .............................. JP2017-001440

(51) Int. Cl.
*H04W 24/02* (2009.01)
*H04W 16/28* (2009.01)
(Continued)

(52) U.S. Cl.
CPC .......... *H04W 24/02* (2013.01); *H04W 16/28* (2013.01); *H04W 56/0015* (2013.01); *H04W 84/042* (2013.01); *H04W 88/02* (2013.01)

(58) Field of Classification Search
CPC .............................. H04W 24/02; H04W 16/28
See application file for complete search history.

(56) References Cited

U.S. PATENT DOCUMENTS

2010/0118839 A1   5/2010   Malladi et al.
2014/0314072 A1  10/2014   Awad et al.
(Continued)

FOREIGN PATENT DOCUMENTS

GB       2496383 A       5/2013
WO    2010/054252 A1    5/2010
(Continued)

OTHER PUBLICATIONS

Extended European Search Report issued in counterpart European Patent Application No. 18736130.8, dated Jul. 9, 2020 (9 pages).
(Continued)

*Primary Examiner* — Ricky Q Ngo
*Assistant Examiner* — Stephen N Steiner
(74) *Attorney, Agent, or Firm* — Osha Bergman Watanabe & Burton LLP

(57) ABSTRACT

The present invention is designed to reduce the decrease of communication throughput even when multiple beams and/or transmission reception points are used. A user terminal according to one aspect of the present invention has a receiving section that receives a predetermined signal, and a measurement section that distinguishes between different beams by using associations between the predetermined signal and beams, and performs beam-level measurement based on the predetermined signal.

5 Claims, 14 Drawing Sheets

(51) Int. Cl.
  *H04W 56/00* (2009.01)
  *H04W 84/04* (2009.01)
  *H04W 88/02* (2009.01)

(56) References Cited

U.S. PATENT DOCUMENTS

| | | |
|---|---|---|
| 2016/0295500 A1 | 10/2016 | Liu et al. |
| 2017/0094624 A1 | 3/2017 | Balachandran et al. |
| 2019/0327650 A1* | 10/2019 | Yiu .................. H04W 36/0085 |
| 2020/0037385 A1* | 1/2020 | Park ...................... H04W 76/18 |

FOREIGN PATENT DOCUMENTS

| | | |
|---|---|---|
| WO | 2015/044976 A1 | 4/2015 |
| WO | 2016/203290 A1 | 12/2016 |

OTHER PUBLICATIONS

Written Opinion of the International Searching Report Authority issued in PCT/JP2018/000057 dated Mar. 27, 2018 (4 Pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).
CMCC; "On separating mobility and data transmission" 3GPP TSG RAN WG1 Meeting #86bis, R1-1612183; Reno, USA, Nov. 10-14, 2016 (6 Pages).
Qualcomm Incorporated; "Conveying symbol index during multi-beam Sync"; 3GPP TSG RAN WG1 Meeting #87, R1-1612034; Reno, Nevada, USA, Nov. 14-18, 2016 (3 Pages).
Written Opinion of the International Searching Report Authority issued in PCT/JP2018/000057 dated Mar. 27, 2018 (8 Pages).
Office Action issued in counterpart Chinese Patent Application No. 201880016195.5, dated Mar. 23, 2021 (10 pages).
Office Action issued in the counterpart European Patent Application No. 18736130.8, dated May 28, 2021 (7 pages).
Office Action issued in Indian Application No. 201917027709; dated Dec. 28, 2021 (7 pages).
Office Action issued in counterpart Japanese Patent Application No. 2018-560407, dated Jan. 25, 2022 (6 pages).
Huawei, HiSilicon; "NR Primary and Secondary Synchronization Signals Design"; 3GPP TSG RAN WG1 Meeting #87, R1-1611261; Reno, USA, Nov. 14-18, 2016 (10 Pages).

* cited by examiner

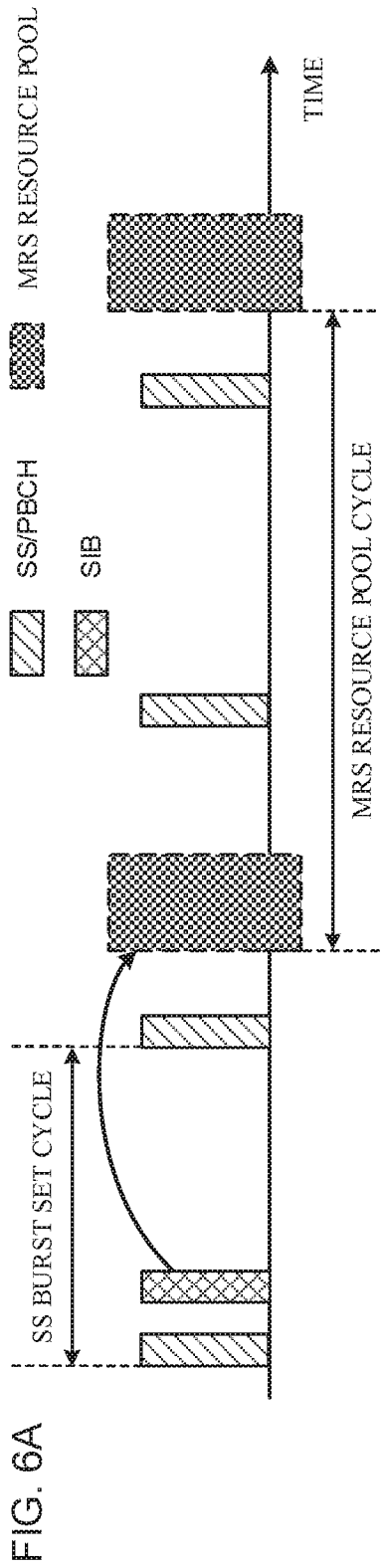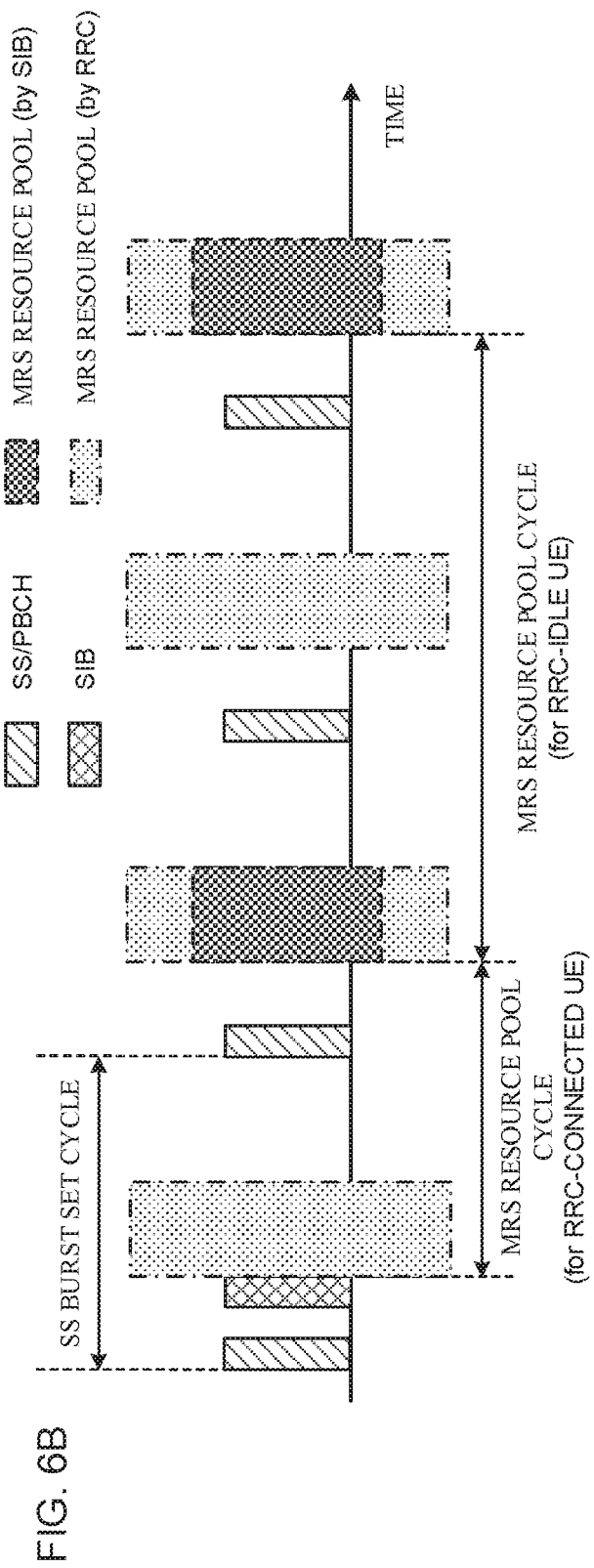

TERMINAL, BASE STATION AND RADIO COMMUNICATION METHOD USING A PLURALITY OF SYNCHRONIZATION SIGNAL BLOCKS

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE 15" and/or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. Furthermore, in CA, a plurality of CCs of the same base station (referred to as an "eNB (evolved Node B)," a "BS (Base Station)" and so on) are configured in a user terminal (UE: User Equipment).

Meanwhile, in LTE Rel. 12, dual connectivity (DC), in which multiple cell groups (CGs) formed by different radio base stations are configured in a UE, is also introduced. Each cell group is comprised of at least one cell (CC). In DC, since multiple CCs of different radio base stations are integrated, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which downlink transmission and uplink transmission are switched over time and made in the same frequency band, are introduced.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra-high speed, large capacity, ultra-low latency, etc.).

For example, 5G/NR is under study to provide radio communication services referred to as "eMBB (enhanced Mobile Broad Band)," "mMTC (massive Machine Type Communication)," "URLLC (Ultra Reliable and Low Latency Communications)," and so on.

Now, in NR, a study is in progress to use beam/TRP-level measurements in order to, for example, identify and update optimal beams/transmission reception points (TRPS) for UEs, for mobility control. However, not solid research has been made yet, especially on how to conduct beam-level measurements. Unless adequate beam-level measurements are stipulated and implemented, inappropriate control may be exerted and the communication throughput may be degraded.

The present invention has been made in view of the above, and it is therefore an object of the present invention to provide a user terminal and a radio communication method, whereby the decrease of communication throughput can be reduced even when many beams and/or transmission reception points are used.

Solution to Problem

A user terminal according to one aspect of the present invention has a receiving section that receives a predetermined signal, and a measurement section that distinguishes between different beams by using associations between the predetermined signal and beams, and performs beam-level measurement based on the predetermined signal

Advantageous Effects of Invention

According to the present invention, the decrease of communication throughput can be reduced even when many beams and/or transmission reception points are used.

BRIEF DESCRIPTION OF DRAWINGS

FIG. 6A and FIG. 6B are diagrams to show examples of MRS resource pools that are specified based on MRS configuration information, according to a second embodiment;

DESCRIPTION OF EMBODIMENTS

An example of mobility control in LTE will be explained first. Coordinated multi-point transmission/reception (COMP) technology was standardized in LTE Rel. 11, to enable dynamic point selection (DPS), in which a UE dynamically switches the communicating TRP by making measurements and reporting with respect to multiple transmission reception points (TRPs) based on channel state information reference signals (CSI-RSs).

Note that a TRP is, for example, a base station, and may be simply referred to as a "transmission point (TP)," a "reception point (RP)" and so on.

In one example of DPS procedures, first, a UE detects cells based on synchronization signals (PSS (Primary Synchronization Signal)/SSS (Secondary Synchronization Signal)) and cell-specific reference signals (CRSs), and issues an RRM (Radio Resource Management) measurement report.

Note that the UE may measure, for example, the received power (for example, RSRP (Reference Signal Received Power)), and report information related to the received power in the RRM measurement report. Note that, in the present specification, the phrase "measure and report" may be used interchangeably with the phrase "measure and/or report."

In the UE, multiple (maximum four) CSI processes for making CSI measurements for each TRP are configured from the connecting cell. The LIE measures and reports the CSI-RSs, transmitted from each TRP, based on the configurations of the CSI processes, and the network dynamically switches the TRP to use for transmission/reception with the UE based on the reported results (DPS).

In the CSI measurement report, the UE may report CSI related to at least one of a channel quality indicator (CQI), a precoding matrix indicator (PMI), a precoding type indicator (PTI), a rank indicator (RI) and so on.

The network may identify the TRP where the received quality of signals at the UE is the highest, based on the measurement results reported from the UE, and use this TRP for transmission and reception with the UE.

Thus, by using multiple CSI processes, even when the UE moves within the same cell, there is no need to switch the cell or reconfigure the RRC (Radio Resource Control) information, and it is possible to continue communicating with the network by switching the communicating TRP of the UE. The management (maintenance) of communication when moving within a cell is also referred to as "layer 1/layer 2 mobility (L1/L2 mobility)."

Note that, when a move (for example, handover across cells) occurs across cells, L1/L2 mobility cannot be maintained, and the connecting cell needs to be switched, and the RRC information needs to be reconfigured. The management (maintenance) of communication when moving between cells is also referred to as "layer 3 mobility (L3 mobility)."

Figures 1A, 1B:
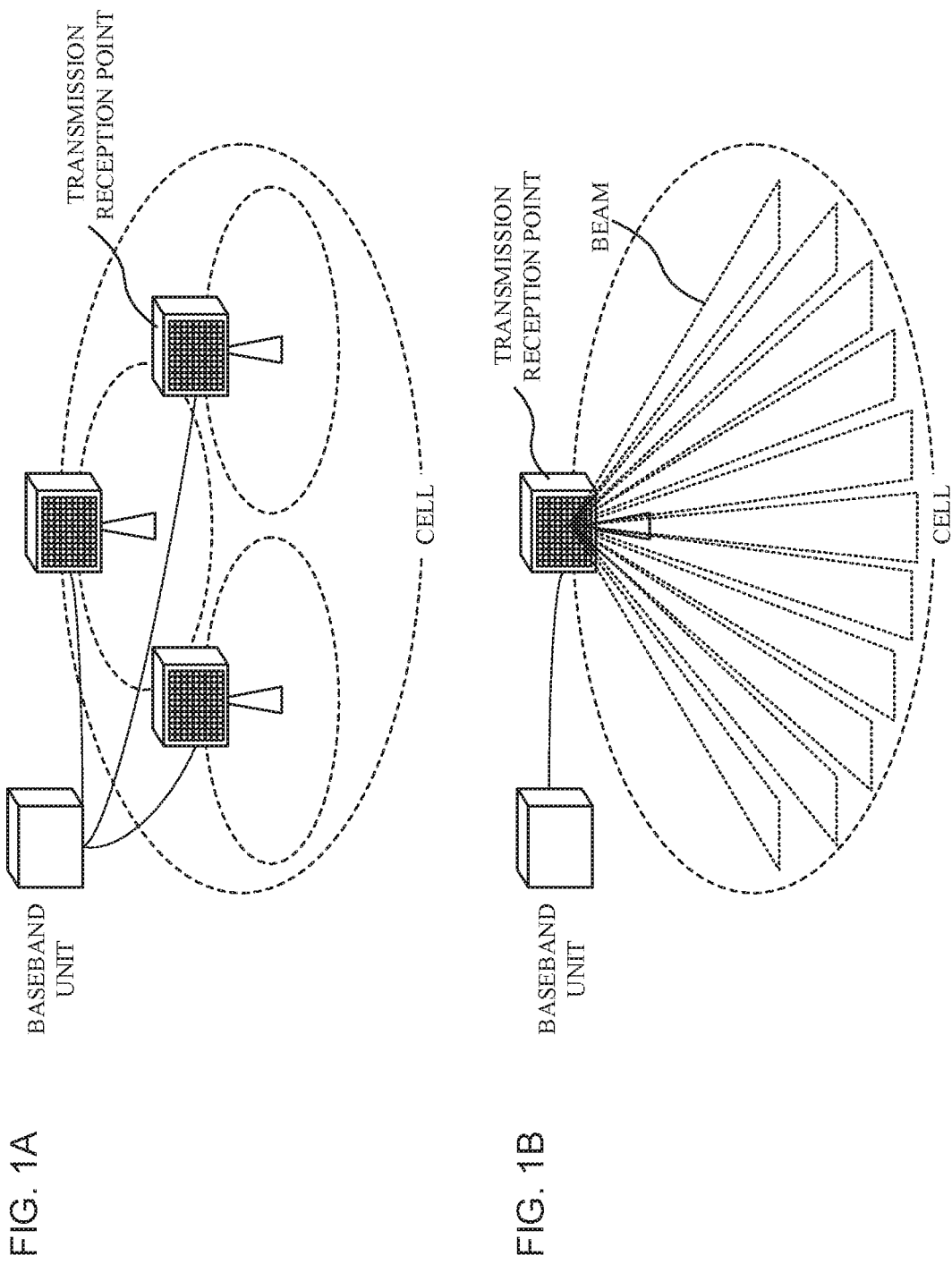
FIG. 1A and FIG. 1B are diagrams to show examples of scenarios studied in NR.

Now, scenarios in which one cell is comprised of multiple TRPs and/or multiple beams are being studied in NR. FIG. 1 provide diagrams to show examples of scenarios being studied in NR. Although FIG. 1A shows an example in which multiple TRPs are connected to the same baseband unit (BBU) and FIG. 1B shows an example in which only one TRP is connected to a BBU, a BBU may be included in one of the TRPs.

In the case of FIG. 1A, the transmission and reception of each TRP may be controlled based on the same cell indicator (which may be referred to as a "physical cell ID (PCI)," "cell ID," etc.), or the area that combines the coverage areas of individual TRPs may be seen as being the same cell. Also, in the case of FIG. 1B, the area combining the coverage areas of individual beams may be seen as being the same cell.

Here, if the area covered by each beam/TRP is narrow, it may occur that, when a UE moves, the LIE will immediately exit the area of the TRP/beam the UE has been communicating with up till then. Considering that each beam/TRP is a "cell," when a scheme is adopted whereby a handover is conducted while a move is in progress, for example, the following problems will arise:

(1) A large volume of signaling is produced accompanying the handover; and (2) During the handover process, the UE goes so far outside the area and can no longer communicate with the current connecting cell (source cell), and has to start over from the initial connection. In this specification, "beam/TRP "may be used interchangeably with "beam and/or TRIP."

Consequently, in NR, in addition to the cell-level measurements for switching the connecting cells, beam/TRP-level measurements for, for example, identifying and updating optimal beams/TRPs for UEs are under study. To be more specific, NR is under study to support cell-level measurements for UEs in RRC idle mode (RRC_IDLE mode), and support at least one of cell-level measurements and beam/TRP-level measurements for RRC-connected mode (RRC_CONNECTED mode).

Note that cell-level measurements may be read as cell-unit measurements, cell-level RRM measurements (measurements in which no distinction is drawn based on in which beams/from which TRPs signals are transmitted, as long as the signals are from the same cell) and so on, and beam/TRP-level measurement may be read as beam/TRP-unit measurements, beam/TRP-level RRM measurements (measurements in which distinction is drawn between the measurement results of different beams/TRPs) and so on. Below, beam/TRP-level measurements will be also simply referred to as "beam-level measurements."

In NR, it is agreed to support both L3 mobility that requires RRC signaling and L1/L2 mobility that does not require RRC signaling, in RRC-connected mode.

Also, in NR, a study is in progress to make measurements and reporting for selecting beams, by using CSI-RSs (CSI measurement RSs) or mobility reference signals (MRSs),as a method of controlling L1/L2 beams in the scenario in which cells are formed with multiple beams.

Here, the MRS has only to be a signal that can be used as an RRM measurement RS, and may be an existing synchronization signal (for example, the PSS/SSS), an existing reference signal (for example, the CRS, the CSI-RS, etc.) or a signal that is obtained byenhancing/modifying these signals. For example, the MRS may be the PSS for NR (NR-PSS) and/or the SSS for NR (NR-SSS), or may be a new reference signal that is designed for RRM measurements. The MRS may be transmitted in one or more beams using one or more antenna ports. Also, the MRS may be referred to as a "measurement signal," "beam-specific RS," "RS to be transmitted per beam," and so on.

In addition, for NR, a study is in progress on, for example, whether to use the same signal or different signals in intra-cell RRM measurements for connected mode and for idle mode.

Nevertheless, even though cell-level measurements may be performed using SSS and/or MRS, no solid research has been made on how to perform beam-level measurements, how a UE should identify the associations between these signals and beams, and so on. Furthermore, even though RRM measurements may be performed using MRSs, no study has been made as to how to allow a UE to identify (distinguish between) the MRS resource configurations of neighboring cells. Unless these are made clear, the UE cannot conduct beam-level measurements adequately, and there is a possibility that inappropriate control may be exerted and the communication throughput may deteriorate.

Note that in mobility-oriented measurements, it is preferable that a UE can discover RSs that are not UE-specific (such as MRS), without much configuration information.

So, assuming the case where a UE makes measurements based on beams, the present inventors have come up with a method of allowing the UE to perform cell-level measurements in idle/connected mode, beam-level measurements in connected mode and so on, with little signaling load.

Now, embodiments of the present invention will be described in detail below with reference to the accompanying drawings. Note that the radio communication methods according to individual embodiments may be applied individually or may be applied in combination.

In this specification, a transmission time interval (TTI) may be read as a predetermined time unit (which is, for example, a subframe, a slot, a minislot, a shortened TTI (sTTI) and so on). A TTI may be specified by a predetermined index (for example, a subframe index, a slot index, a tninislot index, an sTTI index, etc.). Note that a TTI may be referred to as a "long TTI," or may be referred to as a "short TTI."

(Radio Communication Method)

First Embodiment

Figure 2:
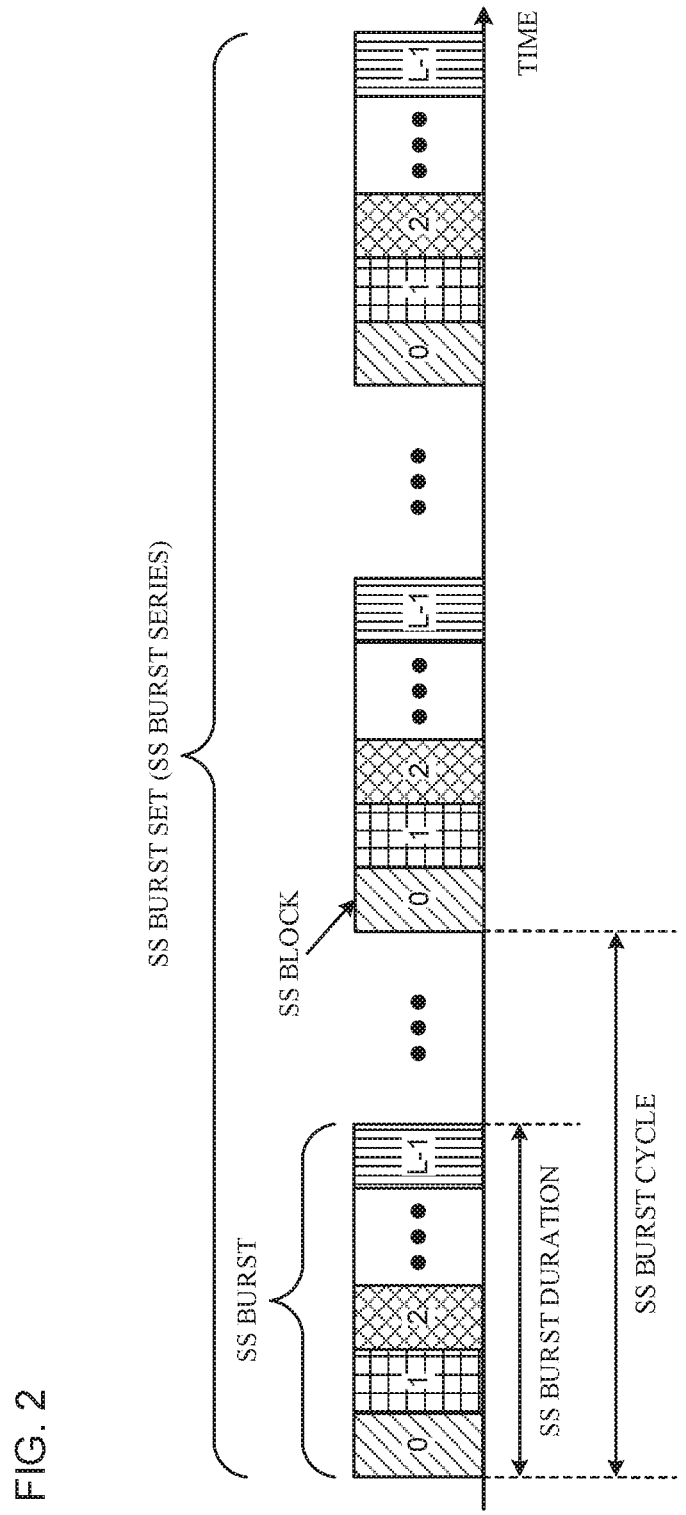
FIG. 2 is a diagram to explain the concept of SS blocks.

Before the first embodiment of the present invention will be described, SS (synchronization signal) blocks will be explained first. FIG. 2 is a diagram to explain the concept of SS blocks. SS blocks refer to resources resource sets) including at least one of PSS, SSS and a broadcast channel (PBCH: Physical Broadcast Channel).

For example, the UE may assume that the PSS, the SSS and the PBCH received in SS blocks corresponding to the same SS block index are transmitted in the same beam. In the following description, the PSS, the SSS and the PBCH may be read as the PSS for NR (NR-PSS), the SSS for NR (NR-SSS) and the PBCH for NR (NR-PBCH), respectively.

A set of one or multiple SS blocks may be referred to as an "SS burst." FIG. 2 shows an example in which the duration of an SS burst=L. In this example, an SS burst is comprised of L SS blocks (SS block index #0 to #L-1) that are consecutive in the time domain, but this is by no means limiting. For example, an SS burst may be formed with SS blocks with consecutive frequency and/or time resources, or formed with SS blocks with non-consecutive frequency and/or time resources.

It is preferable that SS bursts are transmitted in a predetermined cycle (which may be referred to as the "SS burst cycle"). Also, one or more SS bursts may be referred to as an "SS burst set (SS burst series)." For example, a base station and/or a UE may apply beam sweeping to the PSS/SSS/PBCH, by using one or more SS bursts included in one SS burst set, and transmit these signals. Note that the UE may assume that SS burst sets are transmitted periodically (following the SS burst set cycle).

According to the first embodiment, when the demodulation reference signals (DMRSs: DeModulation Reference Signals) for the SSS and/or the PBCEI are used for cell-level measurements, the base station includes and transmits the SS block indices in the PBCH. For example, the SS block indices may be included in broadcast information (for example, the MIB (Master Information Block)) and reported to the UE.

The UE may acquire the PCI from the PSS/SSS, and perform cell-level measurements based on one or multiple SS blocks of the same PCI. Also, the UE may identify the SS block indices from the received PBCH, and perform beam-level measurements based on SS blocks that correspond to the same PCI and the same SS block index. That is, the UE mayperform beam-level measurement per SS block index of each PCI.

Here, the associations between the PSS/SSS and the PBCH are preferably fixed in the specification. Also, with the first embodiment, PSSs/SSSs/PBCHs that correspond to the same SS block index are preferably transmitted using the same beam. In this case, the UE may, for example, identify between different beams based on the SS block indices included in the PBCHs, and carry out RRM measurements using the SSSs (and PBCH-DMRSs) contained in the SS blocks corresponding to these indices.

The PSS/SSS and the PBCH may be time-division-multiplexed (TDM) or frequency-division-multiplexed (FDM). The associations between the PSS/SSS and the PBCH will be explained with reference to FIG. 3 to FIG. 5.

Figure 3:
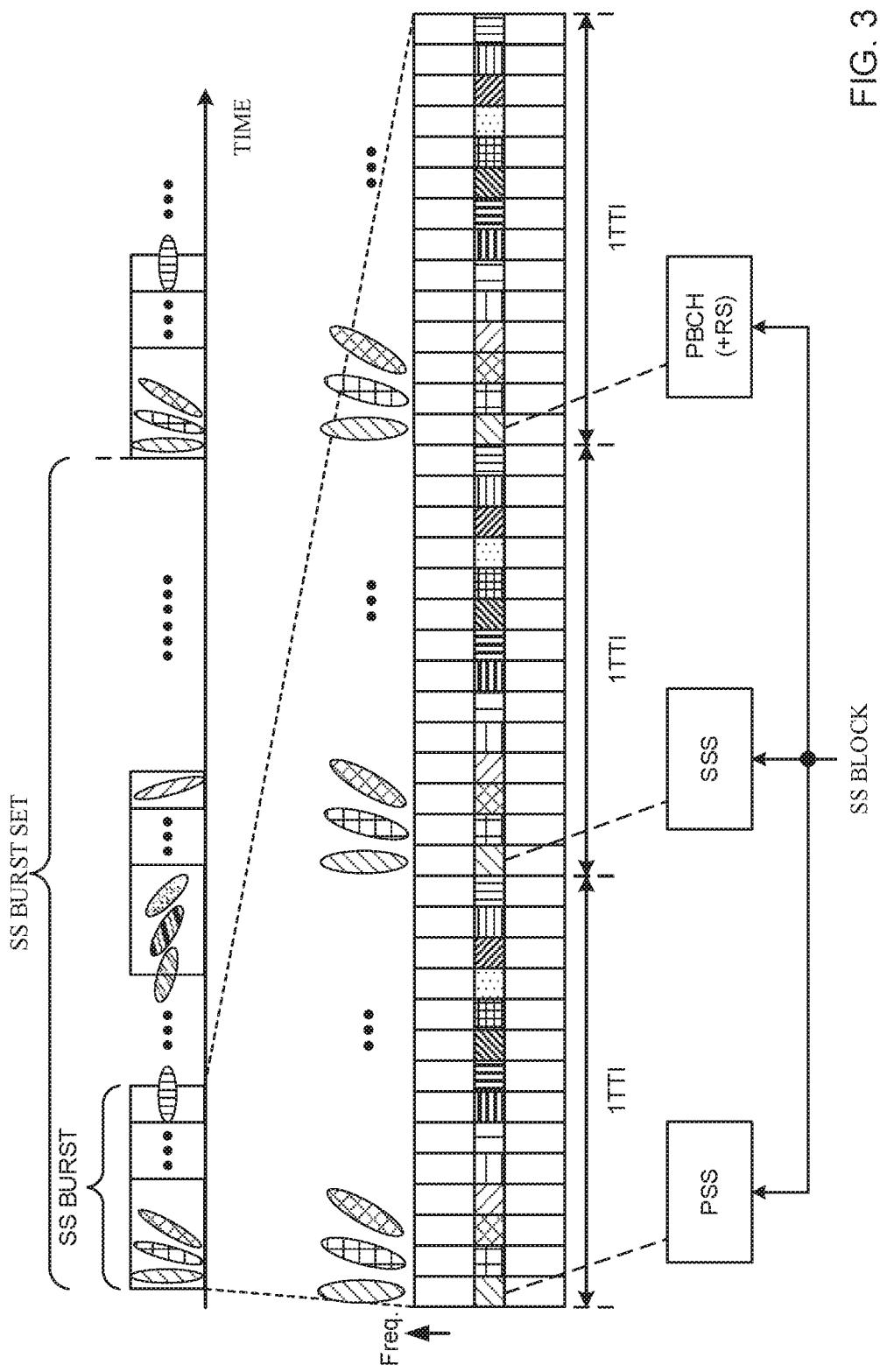
FIG. 3 is a diagram to show an example of time-division-multiplexing (TDM) PSS/SSS/PBCH in different TTIs.

FIG. 3 is a diagram to show an example of the case where the PSS/SSS/PBCH are time-division-multiplexed (TDM) in different TTIs. In FIG. 3, assume that the period of the SS burst set is 40 ms, for example, and multiple SS bursts are transmitted within this period. In one SS burst, multiple SS blocks that respectively correspond to multiple beams are transmitted.

In the example of FIG. 3, in an SS burst, the PSS, the SSS and the PBCH are each subjected to beam sweeping, in this order, for a period of one TTI. In addition, the multiple signals in each illustrated TTI correspond to, for example, SS block index #0 (beginning) to #13 (end).

For example, if the UE recognizes that the PBCHs of SS indices #0, #1 and #2 have been received from the information contained in the PBCHs, the UE may receive the PSSs and/or the SSSs in the resources corresponding to each SS index, and acquire the beam-level measurement result for each index. Also, if the PCIs acquired from these SS indices are the same, the UE may acquire cell-level measurement results based on the measurement results for SS indices #0, #1 and #2.

In the example of FIG. 3, the demodulation reference signal for the PBCH (PBCH-DMRS) is preferably frequency-division-multiplexed (FDM) with the PBCH. Since the resources for the PBCH are distant from the PSS/SSS in the time domain, the accuracy of the demodulation of the PBCH can be improved by using other signals in PBCH demodulation.

Figure 4:
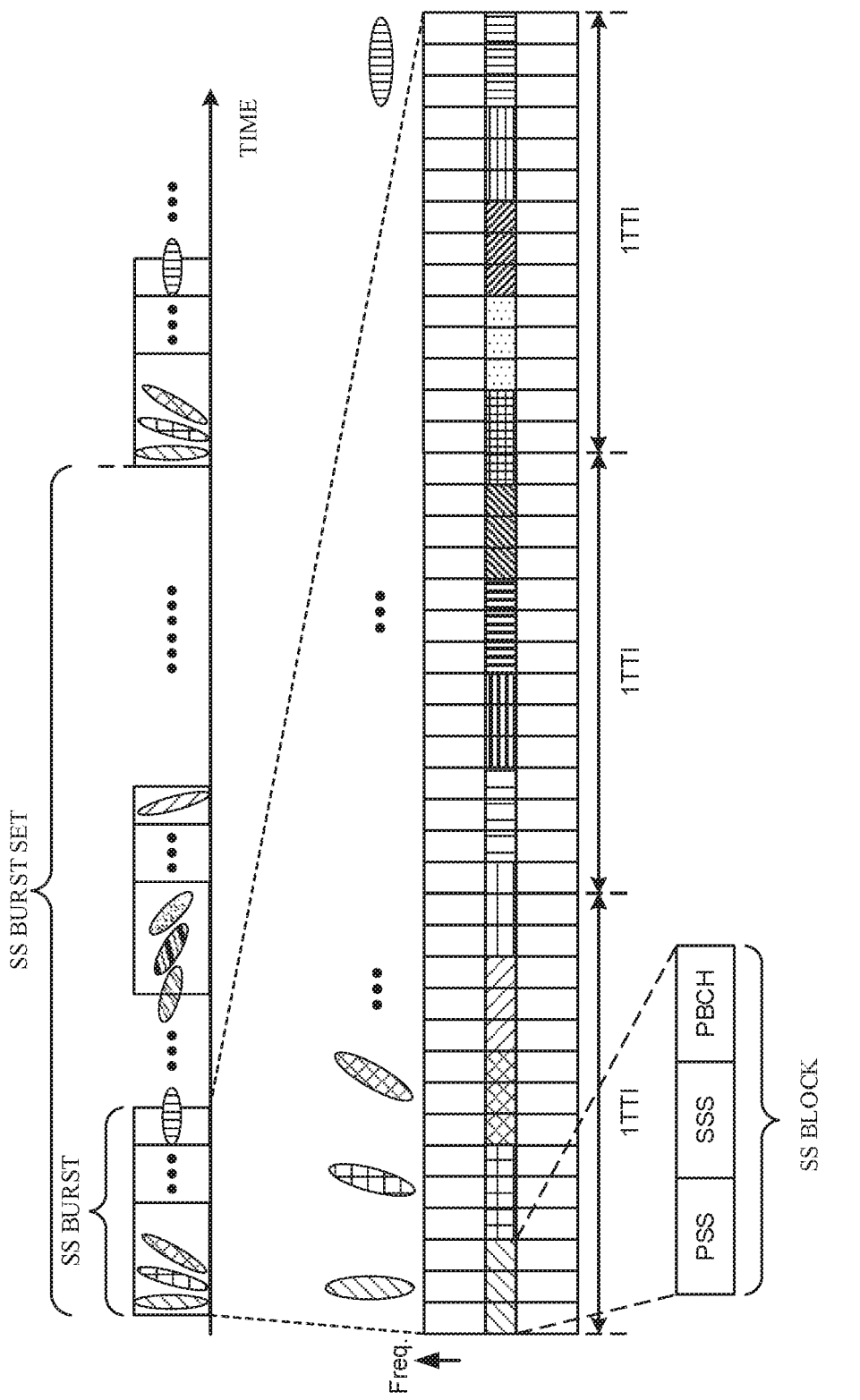
FIG. 4 is a diagram to show an example of time-division-multiplexing (TDM) PSS/SSS/PBCH in adjacent symbols.

FIG. 4 is a diagram to show an example of the case where the PSS/SSS/PBCH is time-division-multiplexed (TDM) in adjacent symbols. In the example of FIG. 4, within an SS burst, beam sweeping and transmission are executed per SS block, which is comprised of three symbols. That is, the PSS, the SSS and the PBCH constituting the same SS block are continuously transmitted in the time domain. The multiple SS blocks in each illustrated SS burst correspond to, for example, SS block index #0 to #13, respectively. With the structure shown in FIG. 4, the measurement of one SS block can be completed in a shorter time than in the case of FIG. 3.

Figure 5:
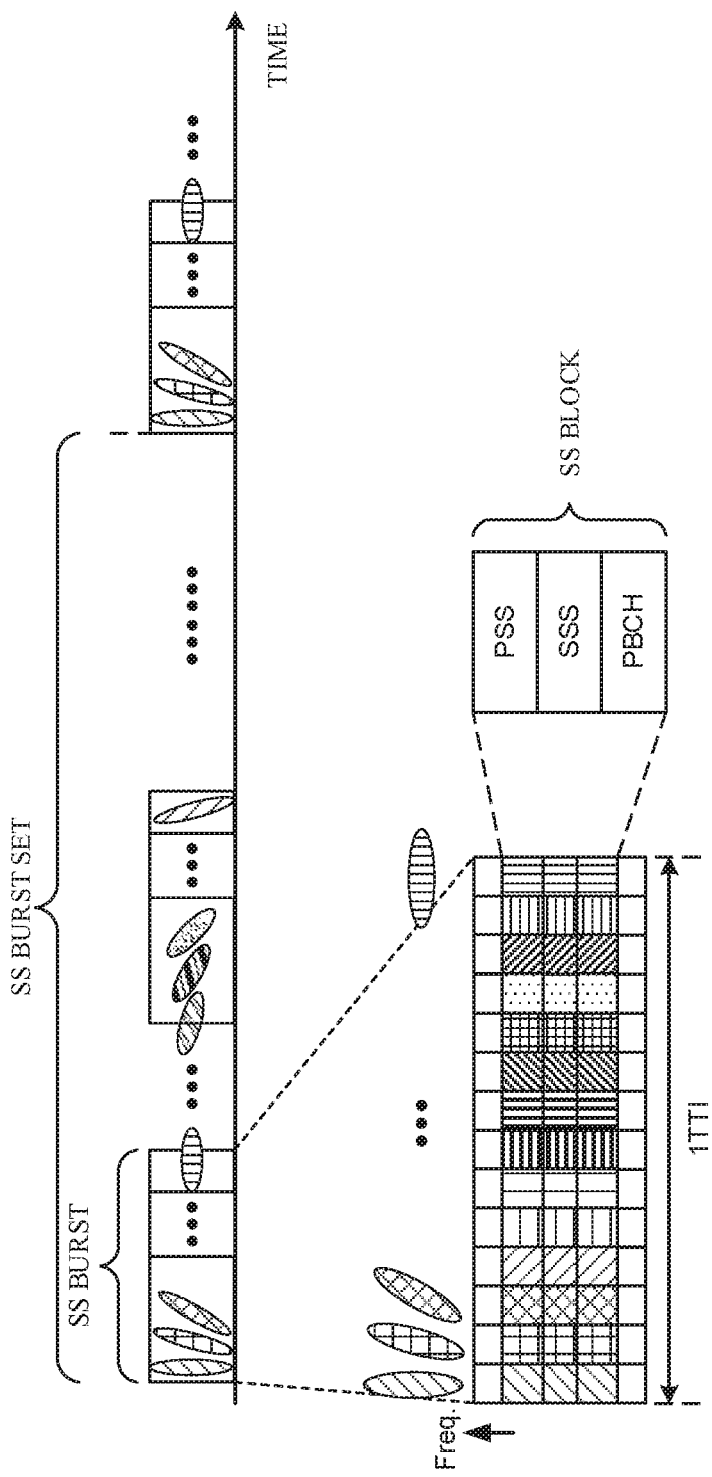
FIG. 5 is a diagram to show an example of frequency-division-multiplexing (FDM) PSS/SSS/PBCH in the same symbol.

FIG. 5 is a diagram to show an example of the case where the PSS/SSS/PBCH are frequency-division-multiplexed (FDM) in the same symbol. In the example of FIG. 5, in an SS burst, beam sweeping and transmission are executed per SS block, which is comprised of one symbol. That is, the PSS, the SSS and the PBCH constituting the same SS block are transmitted at the same time. The multiple SS blocks in each illustrated. SS burst correspond to, for example, SS block index #0 to #13, respectively. With the structure shown in FIG. 5, the measurement of one SS block can be completed in an even shorter time than in the case of FIG. 4.

When the UE reports the beam-level measurement results to the base station, the UE may report the SS block indices used for the measurements, either with the measurement results or apart from the measurement result. In this case, the network can recognize the beam IDs of the beams the UE has used for the measurements, from the SS block indices that are reported.

According to the first embodiment described above, the use of SS blocks allows a UE to perform cell-level measurements in idle/connected mode and/or beam-level measurements in connected mode, with little signaling load, by using the DMRS for the SSS and/or the PBCH.

Second Embodiment

According to a second embodiment of the present invention, when a UE uses an MRS in cell-level measurements and/or beam-level measurements, information about the configurations of the search target (measurement target) MRS (which may be referred to as "MRS configuration information" and so on) and/or the search target ID information are reported to the UE.

These pieces of information may be reported via higher layer signaling, (for example, RRC signaling, MAC (Medium Access Control) signaling, broadcast information (the MIB (Master Information Block), SIBs (System Information Blocks), etc. and so on), physical layer signaling (for example, downlink control information (DCI)) or a combination of these.

The MRS configuration information may be MRS resource information (for example, the range of time and/or frequency resources (timing, bandwidth, etc.), the period, the offset, the number of antenna ports and so on) or the MRS configuration index. A set of time and/or frequency resources in which the MRS can be transmitted may be referred to as an "MRS resource pool." The UE can identify and monitor (measure) the MRS resources to be measured based on the MRS configuration information.

The ID information refers to information that can specify the cell (TRP) and/or the beam transmitting the MRS to be subjected to RRM measurements. The ID information may be information about one or more PCB and/or beam IDs, such as the range, a list or a set of PCIs (and/or beam IDs), and/or the like. The MRS may be a sequence that is scrambled based on a PCI and/or a beam ID. In this case, the UE can perform the measurement process for MRSs that have been successfully descrambled based on the ID information.

Note that it is preferable that the MRS configuration information and/or the ID information are used in common in the serving cell and neighboring cells (adjacent cells). In this case, it is not necessary to transmit these pieces of information to the UE on a per cell basis, so that the signaling overhead and the load of MRS search in the UE can be reduced.

Furthermore, the base station may transmit the MRS configuration information for idle mode in broadcast information (for example, in SIBs), and, to UEs in connected mode, report only those parameters (the period, the bandwidth, etc.) that have been changed from the MRS configuration information for idle mode, as differences, via higher layer signaling (for example, RRC signaling). Also, for some or all of the parameters in the MRS resource configuration information, the base station may report different values from the values reported in SIBs, to UEs in connected mode, via RRC signaling.

FIG. 6A and FIG. 6B are diagrams to show example of MRS resource pools that are specified based on MRS configuration information, according to the second embodiment. In the example of FIG. 6A, a UE determines the bandwidth, the duration (for example, the number of symbols) and the period of the search target MRS resource pool from the SIBs received, and measures the MRS.

Note that an MRS resource pool may be structured to contain resources for the SSs/PBCH transmitted in the SS burst set cycle, or may be structured to contain none. In addition, the MRS may be multiplexed in SS blocks, or may be multiplexed outside SS blocks.

In the example of FIG. 6B, the UE determines the MRS resource pool to be searched from the SIBs received, and measures the MRS. Also, as shown in this example, after RRC connection has been established, an MRS resource pool with a wider bandwidth and a shorter period than the resource pool specified from the SIBs may be configured in the UE via RRC signaling. This allows RRC-connected UEs to perform MRS measurements and reporting in a short time, while idle UEs can reduce the frequency of performing the MRS measurement process and reduce the power consumption.

To distinguish (judge) between different beams, the UE may use fundamental MRS configuration information (which may be referred to as "MRS beam configuration information"). The fundamental MRS configuration information may be, for example, information about the MRS resource pattern (for example, an index) within predetermined time and/or frequency resources (for example, within a resource block (RB) or an RB pool) (MRS division resource pattern, multiplex resource pattern, etc.). The fundamental MRS configuration information may include the associations between MRS resource patterns (for example, MRS resource indices) and beams (for example, beam IDs).

The fundamental MRS configuration information may be stipulated in the specification, or may be reported to the UE via higher layer signaling (for example, RRC signaling, SIBs, etc.). The UE may perform beam-level measurements using the MRS by differentiating different beams based on fundamental MRS configuration information. For example, the UE may monitor (measure) the MRS in resources corresponding to an MRS resource index specified from the fundamental MRS configuration information. Note that, even if no MRS configuration information and/or ID information is reported, the UE may still measure MRSs based on fundamental MRS configuration information.

Figure 7A:
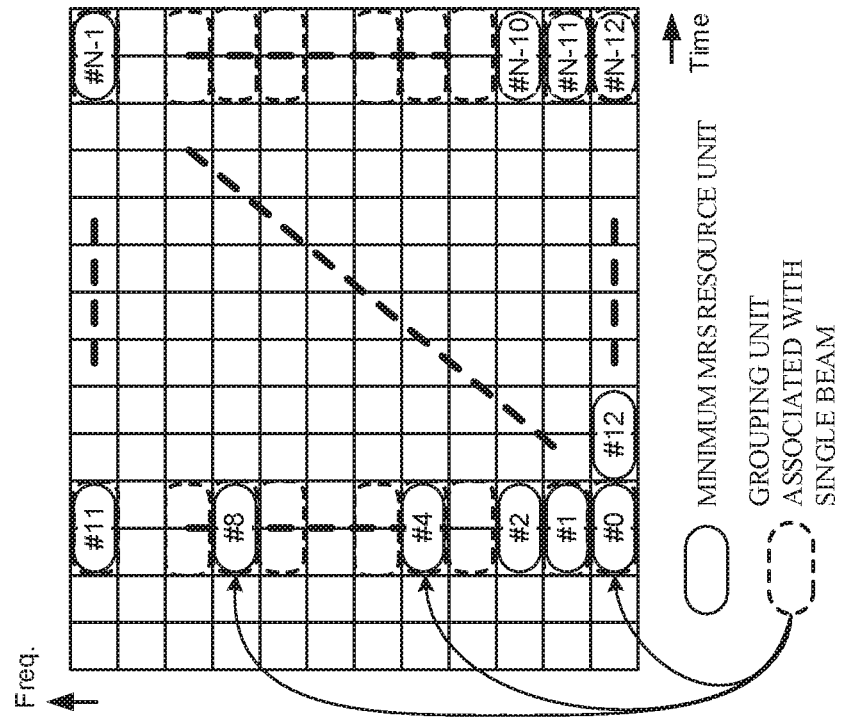
FIG. 7A and 7B are diagrams to show examples of MRS resource patterns.
Figure 7B:
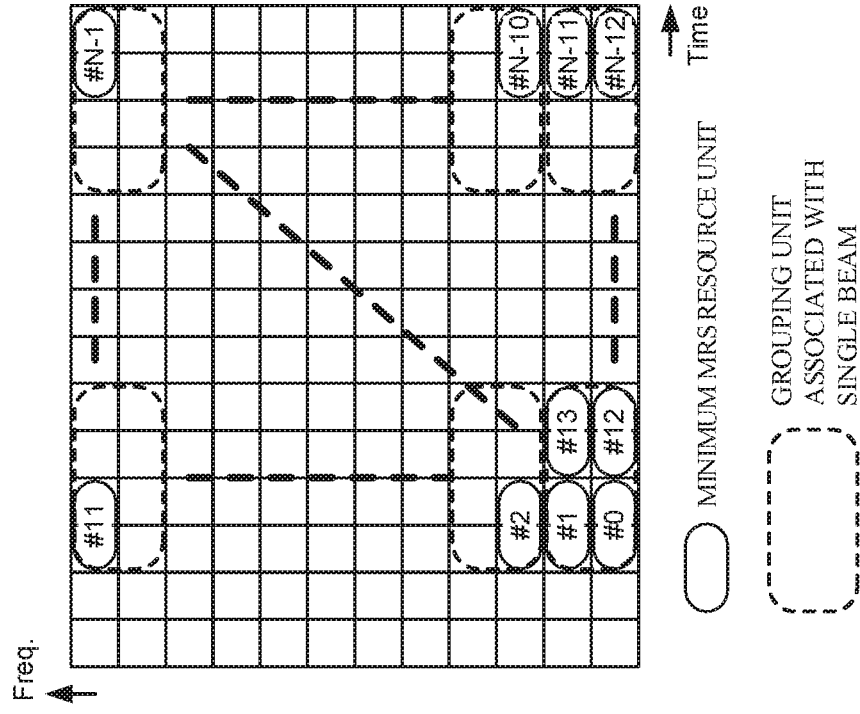

FIG. 7A and FIG. 7B are diagrams to show examples of MRS resource patterns. In these examples, MRS resource patterns to cover an area of one RB pair are shown, but this is by no means limiting. Also, although the following description will assume that two resource elements (REs) constitute the minimum resource unit to be allocated to MRSs (which may be referred to as "minimum MRS resources," "MRS resources," and so on), but this is by no means limiting.

When an MRS is transmitted using a given beam, the MRS may be transmitted in at least one of multiple MRS resources. In FIG. 7, the dashed lines show the grouping units of resources associated with a single beam. In FIG. 7A, these grouping units are multiple MRS resources that are continuous in time and frequency directions, and, in FIG. 7B, these grouping units are a plurality of MRS resources arranged discretely along the frequency direction. Note that a group may be comprised of one or more MRS resources, or each MRS resource may be associated with a different beam.

For example, in the case of FIG. 7A, the UE may assume that the MRSs transmitted in MRS resources #0, #1, #12 and #13 have been transmitted in the same beam. Also, in the event of FIG. 7B, the UE may assume that the MRSs transmitted in MRS resources #0, #4 and #8 have been transmitted in the same beam.

As fundamental MRS configuration information, the associations (grouping configuration) between MRS resource indices and groups, information about the MRS resource indices that are actually used (or not used) and/or the like may be reported to the UE. For example, in FIG. 7B, MRS resource #2 is not used for MRS transmission, so that the base station may report index #2 to the UE as information about an unused MRS resource.

When the UE reports the beam-level measurement results to the base station, the UE may report the indices of MRS resources in an RB or in an RB pool (the resource indices of MRSs that have been measured) to the base station, either with the measurement results or apart from the measurement results. In this case, the network can learn the beam IDs of the beams the UE has used for the measurements, based on the MRS resource indices that are reported, so that it is not necessary to transmit information related to beam IDs in MRSs.

According to the second embodiment described above, a UE can identify the MRS resource configurations of the serving cell and neighboring cells with little signaling load, and perform cell-level measurements and/or beam-level measurements.

Third Embodiment

According to a third embodiment of the present invention, the MRS is comprised of a first part, in which PCI-based sequences are transmitted, and a second part, in which beam IDs are communicated. By this means, it is possible to distinguish between different beams, by using MRSs, and carry out beam-level measurements adequately.

Assume that the above two parts are transmitted on the same antenna port. The method of generating PCI-based sequences may be the same as that for the PSS and/or the SSS (the same sequences as the PSS and/or the SSS may be used). For example, in the first part, PCI-scrambled sequences may be transmitted.

In addition, beam IDs are transmitted together with PCI within the same MRS, so that a distinction can be drawn even between MRSs with the same beam ID, as long the PCI varies. Therefore, it is preferable not to use overlapping beam IDs within a cell.

A beam ID may be implicitly communicated using a sequence that is generated based on the beam ID, or may be explicitly communicated as a message (modulated data). In the former case, a sequence that is scrambled with the beam ID may be transmitted in the second part. Also, in the latter case, the UE may use the first part of the MRS as a reference signal for demodulating the second part.

Figure 8A:
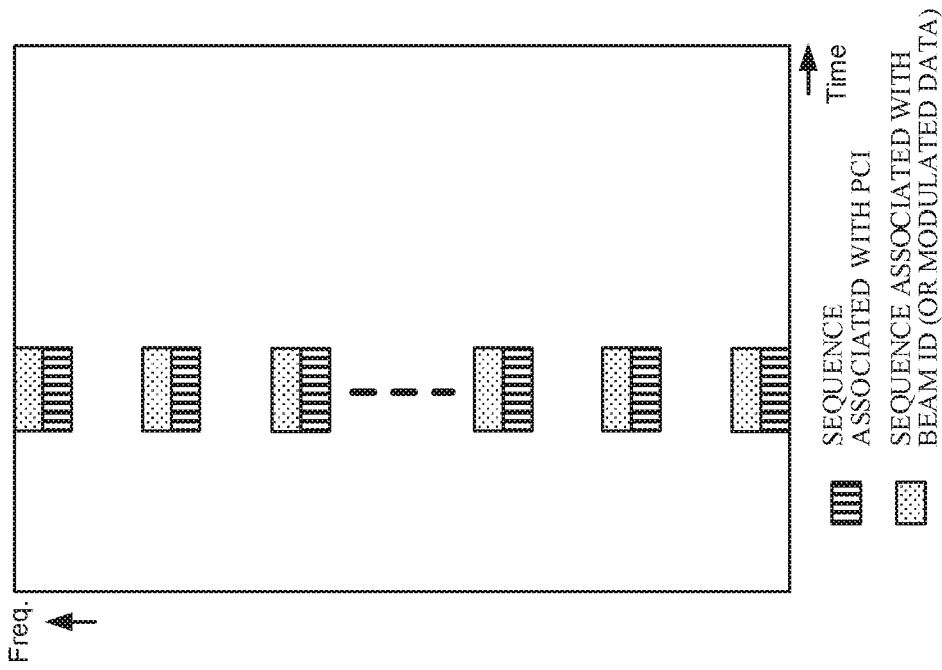
FIG. 8A and FIG. 8B are diagrams to show examples of MRS resource mapping according to a third embodiment.
Figure 8B:
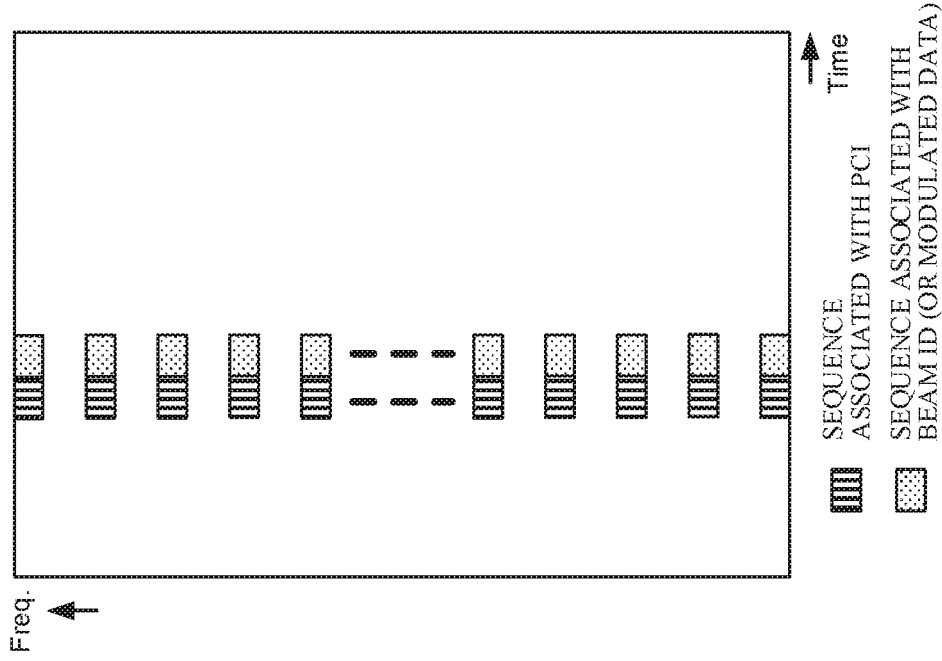

The first part and the second part may be multiplexed using any of time division multiplexing (TDM), frequency division multiplexing (FDM) and code division multiplexing (CDM), or a combination of these. FIG. 8A and FIG. 8B are diagrams to show examples of MRS resource mapping according to the third embodiment. The first part and the second part of the MRS are mapped using TDM in FIG. 8A and mapped using FDM in FIG. 8B. Note that the resource size, the number, the positions, etc. of parts to be mapped in the frequency domain and/or the time domain are not limited to the examples shown in FIG. 8.

Note that, although the third embodiment assumes that PCI is communicated in the first part, it is equally possible to communicate different information, as long information that can identify cells (TRPs) is communicated.

Also, although the third embodiment assumes that beam IDs are communicated in the second part, it is equally possible to communicate different information, as long information that can identify beams is communicated. For example, the beam IDs according to the third embodiment may be replaced with SS block indices.

Also, although, according to the third embodiment, the MRS is comprised of two parts, this is by no means limiting. For example, the MRS may be comprised of a single sequence that is scrambled by both PCI and a beam ID, so that, when an MRS sequence is received, a UE may demodulate this and specify the PCI and the beam ID.

According to the third embodiment described above, a UE can identify the associations between MRSs and beams with little signaling load, and perform beam-level measurements.

(Variations)

Note that the radio communication methods according to the herein-contained embodiments may be appropriately switched (or combined) and used. For example, a UE may conduct SSS-based cell-level measurements in accordance with the first embodiment in idle mode, and conduct MRS-based cell level/beam-level measurements in accordance with the second and/or the third embodiment in connected mode.

Furthermore, in this specification, beams are identified (differences among multiple beams are judged) based on, but not limited to, at least one of following (1) to (9): (1) the resources (for example, time and/or frequency resources); (2) the SS block (SS block index); (3) the antenna port; (4) precoding (for example, whether or not precoding is applied, the precoding weight, etc.); (5) the transmission power; (6) the phase rotation; (7) the beam width; (8) the beam angle (for example, the tilt angle); and (9) the number of layers.

Also, the term "beam" used in this specification may be used interchangeably with at least one of above (1) to (9), and, for example, a "beam" may be read as a "resource," an "antenna port," and so on.

(Radio Communication System)

Now, the structure of a radio communication system according to one embodiment of the present invention will be described below. In this radio communication system, communication is performed using one or a combination of the radio communication methods according to the herein-contained embodiments of the present invention.

Figure 9:
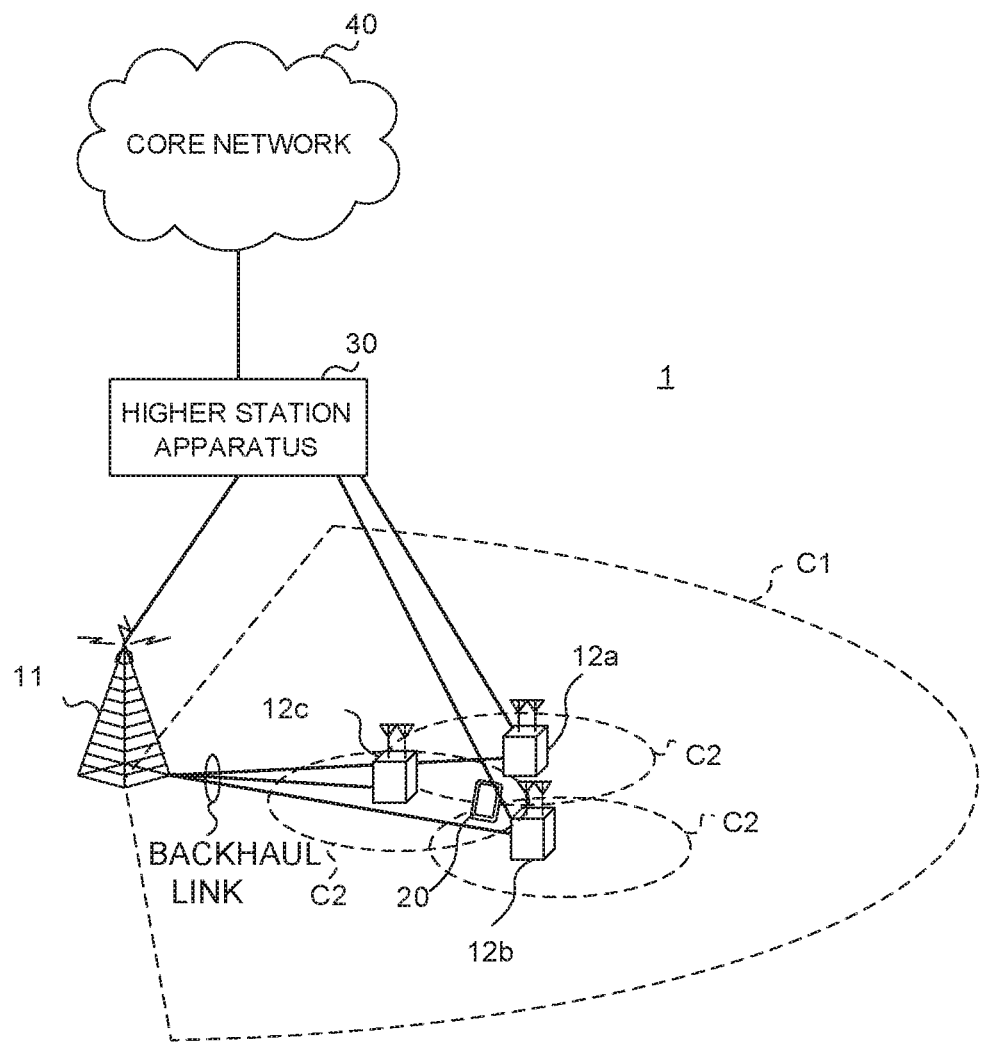
FIG. 9 is a diagram to show an example of a schematic structure of a radio communication system according to one embodiment of the present invention.

FIG. 9 is a diagram to show an example of a schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the UE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and the number of cells and user terminals 20 are not limited to those shown in the drawing. For example, each cell may be formed with multiple transmission reception points (TRPs), and the radio base station 11 and/or the radio base stations 12 may control one or more TRPs.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBS (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) (including, for example, PDSCH and/or PUSCH scheduling information) and so on are communicated through the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels.

User data, higher layer control information and so on are communicated by the PUSCH. Also, downlink radio quality information (CQI: Channel Quality Indicator), delivery acknowledgement information and so on are communicated by the PDCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 10:
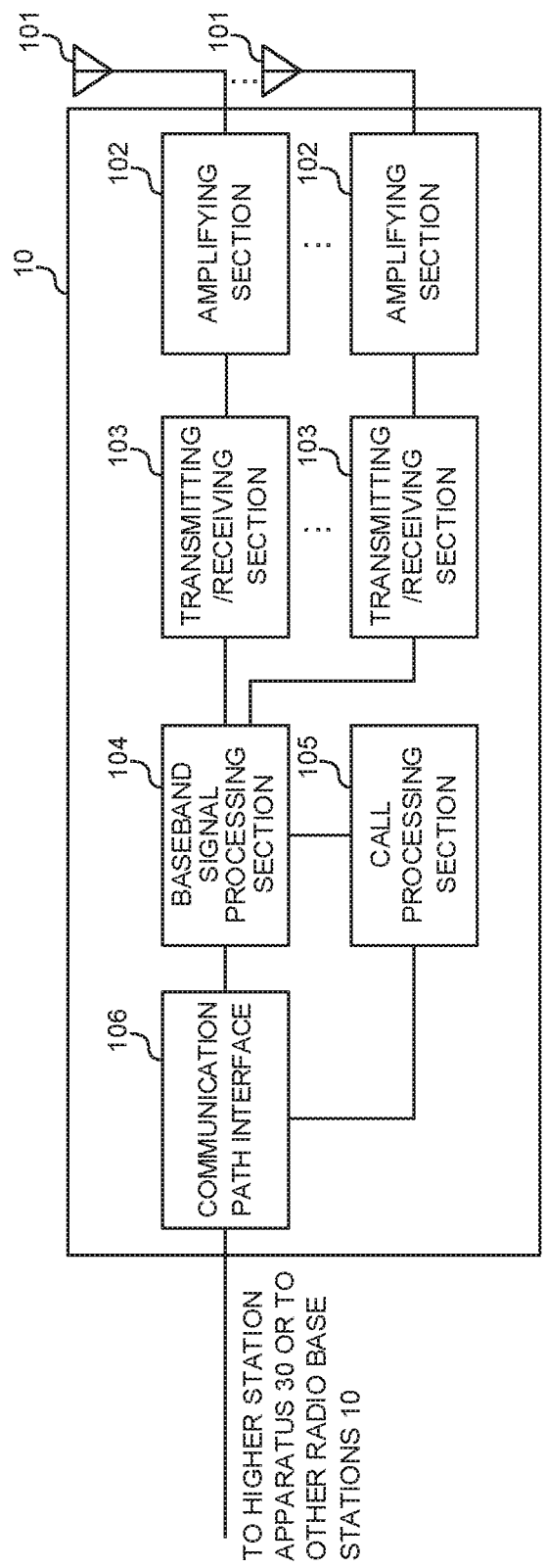
FIG. 10 is a diagram to show an example of an overall structure of a radio base station according to one embodiment of the present invention.

FIG. 10 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer smission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains, Furthermore, the transmitting/receiving antennas 101 may be constituted by, for example, array antennas.

The transmitting/receiving sections 103 transmit a predetermined signal (for example, the MRS, the SSS, the DMRS, etc.) to the user terminal 20. Furthermore, the transmitting/receiving sections 103 may receive measurement results from the user terminal 20 (for example, RRM measurement results, CSI measurement results, etc.)

The transmitting/receiving sections 103 may send MRS configuration information, ID information, fundamental MRS configuration information, and so on. The transmitting/receiving sections 103 may transmit SS block indices using the broadcast channel (for example, the PBCH). The transmitting/receiving section 103 may receive the resource index, the SS block index, etc. of the predetermined signal that has been measured.

Figure 11:
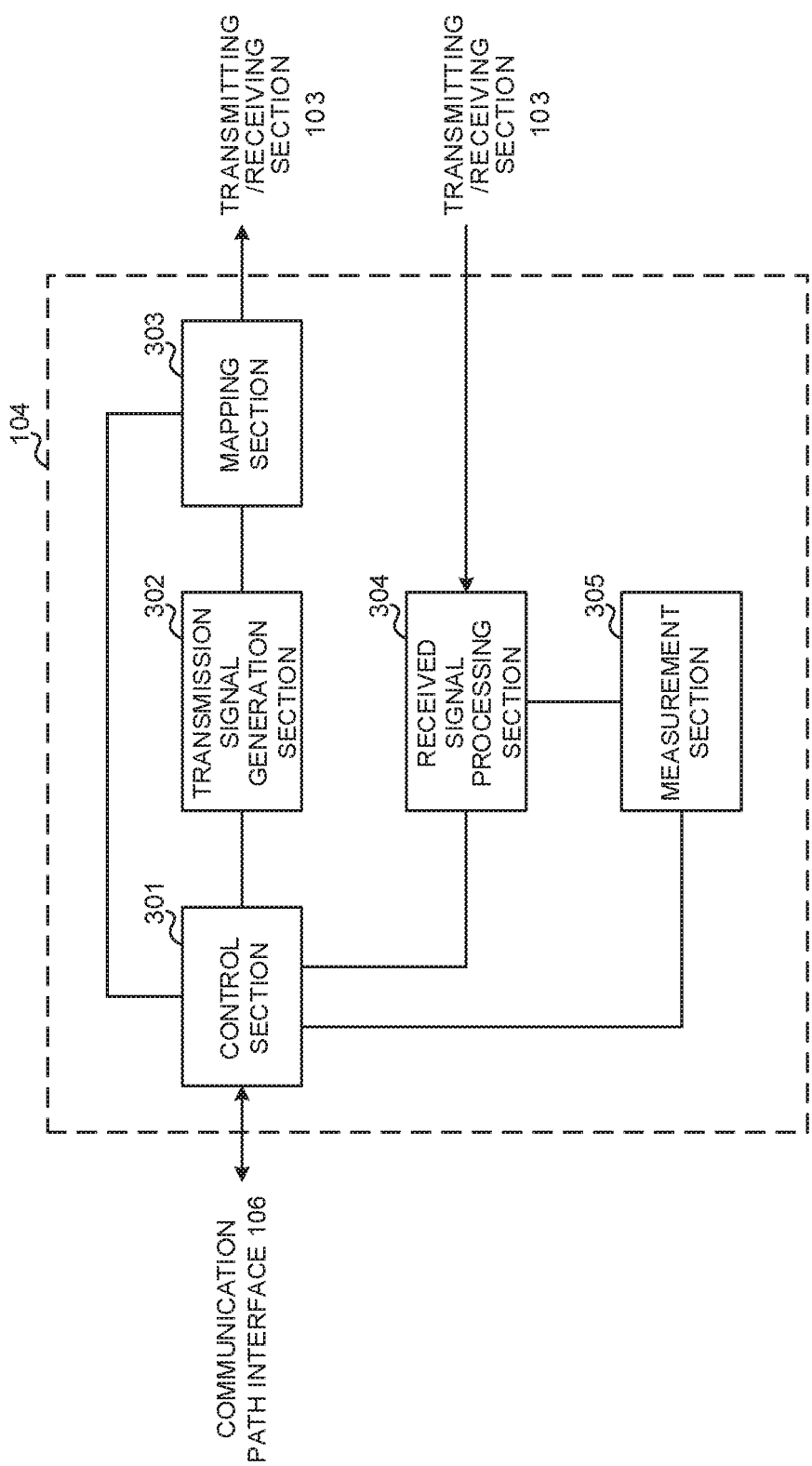
FIG. 11 is a diagram to show an example of a functional structure of a radio base station according to one embodiment of the present invention.

FIG. 11 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on based on the results of deciding whether or not retransmission control is necessary in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals and so on.

The control section 301 may exert control so that transmitting beams and/or receiving beams are formed using the digital BF (for example, precoding) by the baseband signal processing section 104 and/or the analog BF (for example, phase rotation) by the transmitting/receiving sections 103. The control section 301 may exert control so that beams are formed based on downlink transmission path information, uplink transmission path information and so on. These pieces of transmission path information may be obtained from the received signal processing section 304 and/or the measurement section 305. Note that transmission using transmission beams may be paraphrased as "transmission of signals to which predetermined precoding is applied," and so on.

The control section 301 exerts control to transmit one or multiple predetermined signals (which may be, for example, the MRS, the SSS, the DMRS and so on, and which may be referred to as "measurement signal."). The control section 301 may transmit information (for example, fundamental MRS configuration information, etc.) about the associations between the above predetermined signal and beams to the user terminal 20, and control the user terminal 20 to distinguish between varying beams.

The control section 301 may exert control so that SS blocks corresponding to the same SS block index are transmitted in the same beam.

The control section 301 may form the above predetermined signal with a first part, which is based on information that can specify cells (for example, PCI), and a second part, which is based on information that can specify beams (for example, beam IDs).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains, For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements, and so on based on the received signals. The measurement section 305 may measure the received power (for example, RSRP (Reference Signal Received Power)), the received quality (for example, RSRQ (Reference Signal Received. Quality), SINR (Signal to Interference plus Noise Ratio), etc.), the signal strength (for example, RSSI (Received Signal Strength indicator)), transmission path information (CSI) and so on. The measurement results may be output to the control section 301.

(User Terminal)

Figure 12:
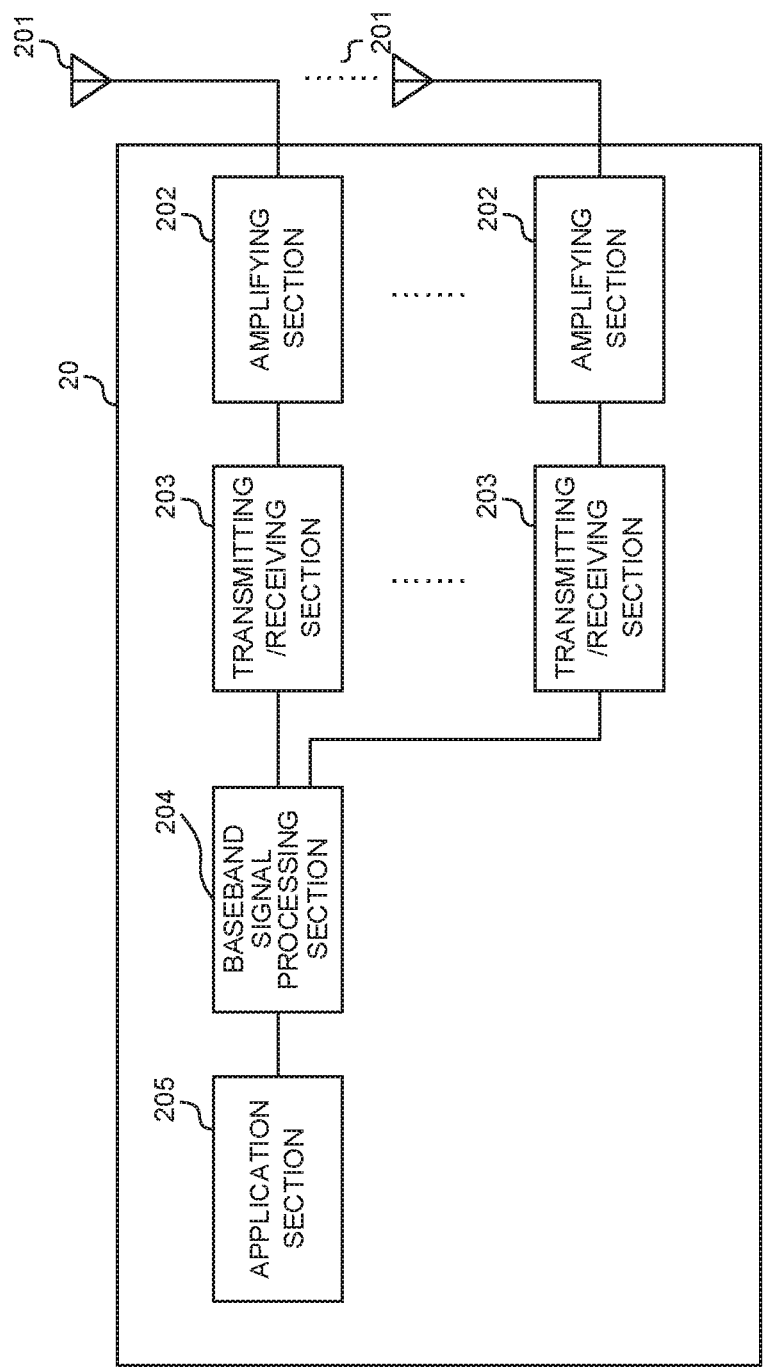
FIG. 12 is a diagram to show an example of an overall structure of a user terminal according to one embodiment of the present invention.

FIG. 12 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 receive a predetermined signal (for example, the MRS, the SSS, the DMRS, etc.) from a radio base station 10. In addition, the transmitting/receiving, sections 203 may report (transmit) the measurement results (for example, RRM measurement results, CSI measurement results and so on) that are output from the measurement section 405 to the radio base station 10.

The transmitting/receiving sections 203 may receive SS block indices, MRS configuration information, ID information, fundamental MRS configuration information and so on. The transmitting/receiving sections 203 may transmit the resource index, SS block index and so on of the predetermined signal that has been measured.

Figure 13:
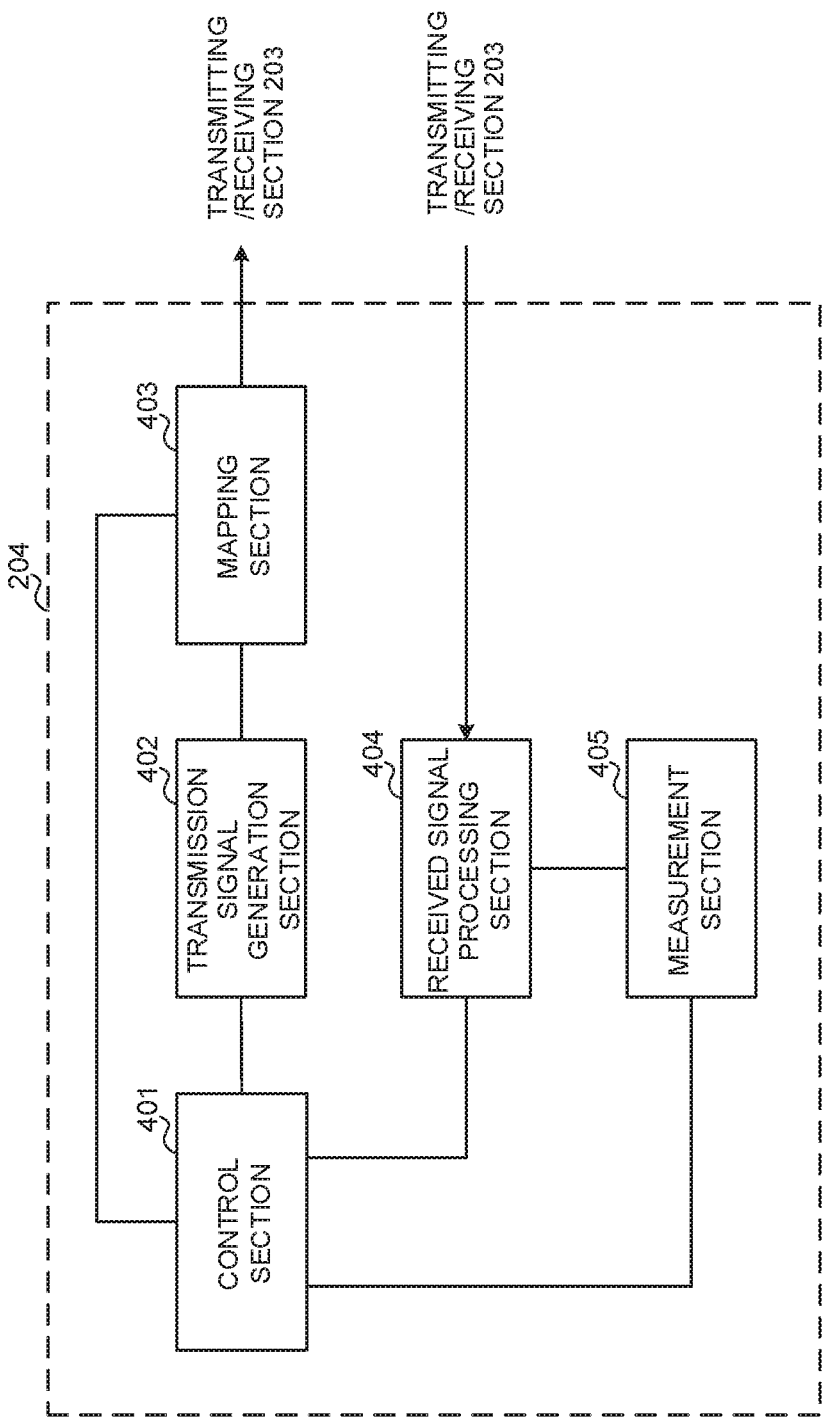
FIG. 13 is a diagram to show an example of a functional structure of a user terminal according to one embodiment of the present invention.

FIG. 13 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and the downlink data signals transmitted from the radio base station 10, via the received signal processing section 404. The control section 401 controls the generation of uplink control signals and/or uplink data signals based on the results of deciding whether or not retransmission control is necessary in response to the downlink control signals and/or downlink data signals, and so on.

The control section 401 may exert control so that transmitting beams and/or receiving beams are formed using the digital BF (for example, preceding) by the baseband signal processing section 204 and/or the analog BF (for example, phase rotation) by the transmitting/receiving sections 203. The control section 401 may perform control so that beams are formed based on downlink transmission path information, uplink transmission path information, and so on. These pieces of transmission path information may be obtained from the received signal processing section 404 and/or the measurement section 405.

The control section 401 may control the measurements in the measurement section 405 based on a predetermined signal (for example, the MRS, the SSS, the DMRS, etc.).

Also, when various types of information reported from the radio base station 10 is acquired from the received signal processing section 404, the control section 401 may update the parameters used for control based on these pieces of information.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates ink data. signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCA and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on, based on the received signals. Measurement section 405 may measure the received power (for example, RSRP), the received quality (for example, RSRQ, SINR, etc.), the signal strength (for example, RSSI), the transmission path information (for example, CSI) and so on. The measurement results may be output to the control section 401.

The measurement section 405 may perform cell-level measurements based on a predetermined signal (for example, the MRS, the SSS, the DMRS, etc.). Furthermore, the measurement section 405 may distinguish between different beams (distinguish between the above-mentioned predetermined signals transmitted in varying beams) by using the associations between the predetermined signal (for example, the MRS, the SSS, the DMRS, etc.) and beams, and perform beam-level measurements based on this predetermined signal. Note that the cell-level measurements and/or the beam-level measurements may be RRM measurements or other measurements.

For example, the measurement section 405 may judge that SS blocks that correspond to an SS block index acquired from the received signal processing section 404 (for example, one received in the broadcast channel (PBCH)) are transmitted in the same beam. In this case, the measurement section 405 may perform beam-level measurements based on the above predetermined signals included in SS blocks corresponding to the same SS block index.

The measurement section 405 may use the measurement results of SS blocks corresponding to predetermined PCI, among the measurement results pertaining to one or multiple SS blocks, and derive the cell-level measurement result for the cell of the predetermined PCI. Furthermore, the measurement section 405 may use the measurement results of SS blocks corresponding to the same PCI and the same SS block index, among the measurement results pertaining to one or multiple SS blocks, and derive the beam-level measurement results for predetermined beams of the cell of the predetermined PCI.

The measurement section 405 may perform cell-level measurements and/or beam-level measurements based on the above predetermined signals by using at least one of configuration information (for example, MRS configuration information) related to the above predetermined signal, and ID information (for example, information about one or more PCIs and/or beam IDs). For example, the measurement section 405 may perform beam-level measurements based on the above predetermined signal by distinguishing between different beams based on information about the associations between the resource indices of the above predetermined signals and beams.

The measurement section 405 may use the above predetermined signal, comprised of a first part, which is generated based on information that can specify cells (for example, PCI), and a second part, which is generated based on information that can specify beams (for example, beam IDs), and perform beam-level measurements based on the above predetermined signals. In this case, the measurement section 405 may distinguish between different beams based on the above second part.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 14:
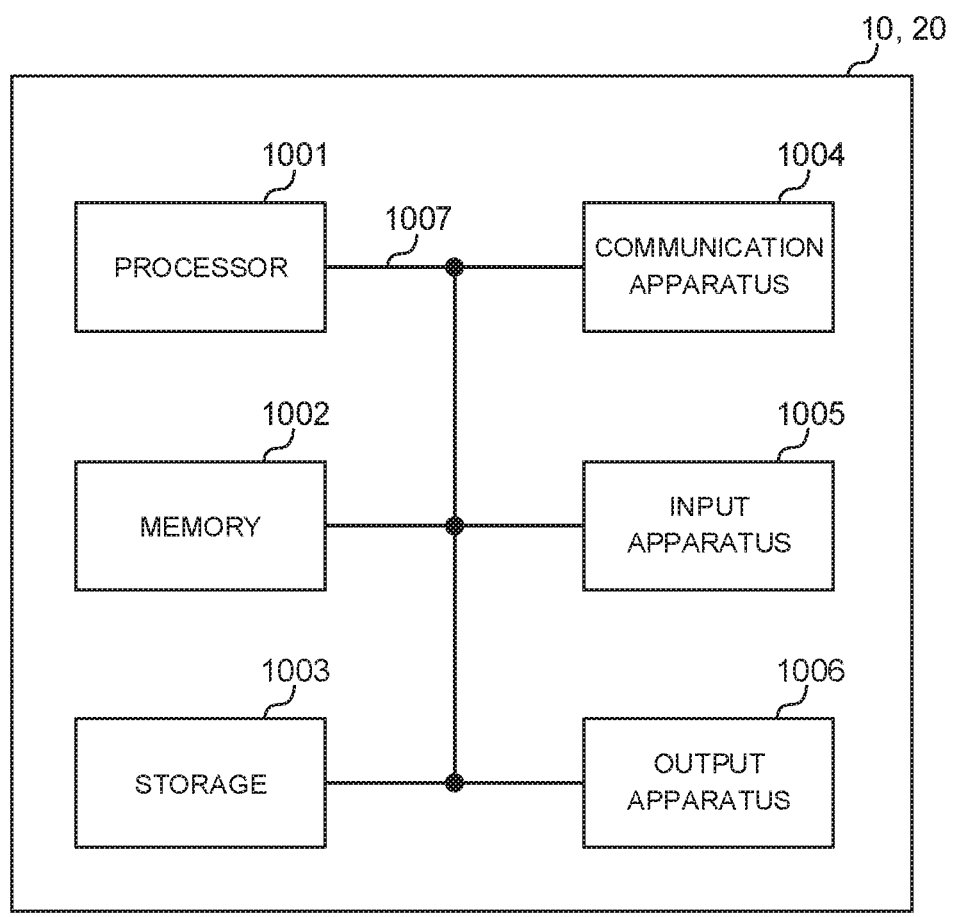
FIG. 14 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 14 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etcmagnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, one ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)", or a plurality of consecutive subframes may be referred to as a "TTI," or one slot or mini-slot may be referred to as a "TTI." That is, a subframe and/or a may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices.

In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," a "NodeB," an "eNodeB (eNB)," an "access point," a "transmission reception point (TRP)," a "transmission point," a "reception point," a "femto cell," a "small cell," and suchlike terms.

A base station can accommodate one or more (for example, three)cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may he interpreted as "access." As used herein, two elements may be considered "connected" or "coupled" to each other by using one or more electrical wires, cables and/or printed electrical connections, and, as a number of non-limiting and non-inclusive examples, by using electromagnetic energy having wavelengths in radio frequency regions, microwave regions and/or optical regions (both visible and invisible).

When terms such as "include," "comprise" and variations of these are used in this specification or in claims, these terms are intended to be inclusive, in a. manner similar to the way the term "provide" is used. Furthermore, the term "or" as used in this specification or in claims is not intended to mean an exclusive disjunction.

The phrase "A and B are different" as used in the present specification or claims may indicate that A and B are mutually different.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-001440, filed on Jan. 6, 2017, including the specification, drawings and abstract, is incorporated herein by reference in its entirety.

The invention claimed is:

1. A terminal comprising:
a receiver that receives signals in synchronization signal blocks each having a synchronization signal block index, each of the synchronization signal blocks being a resource including a Primary Synchronization Signal (PSS), a Secondary Synchronization Signal (SSS), and a Physical Broadcast Channel (PBCH), the synchronization signal blocks including a plurality of synchronization signal blocks with a same synchronization signal block index; and
a processor that performs cell-level measurement based on the signals received in the synchronization signal blocks,
wherein the terminal is provided with synchronization signal block index information via the PBCH including a Master Information Block notified from a base station, and
wherein the processor measures received power by using SSSs included in the plurality of synchronization signal blocks with the same synchronization signal block index and acquires a measurement result for the same synchronization signal block index.

2. A radio communication method for a terminal, comprising:
receiving signals in synchronization signal blocks each having a synchronization signal block index, each of the synchronization signal blocks being a resource including a Primary Synchronization Signal (PSS), a Secondary Synchronization Signal (SSS), and a Physical Broadcast Channel (PBCH), the synchronization signal blocks including a plurality of synchronization signal blocks with a same synchronization signal block index; and
performing cell-level measurement based on the signals received in the synchronization signal blocks,
wherein the terminal is provided with synchronization signal block index information via the PBCH including a Master Information Block notified from a base station, and
wherein the terminal measures received power by using SSSs included in the plurality of synchronization signal blocks with the same synchronization signal block index and acquires a measurement result for the same synchronization signal block index.

3. A base station comprising:
a transmitter that transmits signals in synchronization signal blocks each having a synchronization signal block index, each of the synchronization signal blocks being a resource including a Primary Synchronization Signal (PSS), a Secondary Synchronization Signal (SSS), and a Physical Broadcast Channel (PBCH), the synchronization signal blocks including a plurality of synchronization signal blocks with a same synchronization signal block index; and
a receiver that receives, from a terminal that received the signals in the synchronization signal blocks, a cell-level measurement result and a measurement result of received power of SSSs,
wherein the measurement result is obtained on the terminal by measuring the received power by using SSSs included in the plurality of synchronization signal blocks with the same synchronization signal block index, and
wherein the transmitter transmits the PBCH including a Master Information Block and synchronization signal block index information to the terminal.

4. A system comprising: a terminal; and a base station, wherein
the terminal comprising:
a receiver that receives signals in synchronization signal blocks each having a synchronization signal block index, each of the synchronization signal blocks being a resource including a Primary Synchronization Signal (PSS), a Secondary Synchronization Signal (SSS), and a Physical Broadcast Channel (PBCH), the synchronization signal blocks including a plurality of synchronization signal blocks with a same synchronization signal block index; and
a processor that performs cell-level measurement based on the signals received in the synchronization signal blocks,
wherein the terminal is provided with synchronization signal block index information via the PBCH including a Master Information Block notified from the base station, and
wherein the processor measures received power by using SSSs included in the plurality of synchronization signal blocks with the same synchronization signal block index and acquires a measurement result for the same synchronization signal block index,
the base station comprising:
a transmitter that transmits the signals in the synchronization signal block; and
a receiver that receives from the terminal, a cell-level measurement result and the measurement result of the received power,
wherein the transmitter transmits the PBCH including the Master Information Block and the synchronization signal block index information to the terminal.

5. The terminal according to claim 1, wherein the measurement result comprises a common measurement value for the plurality of synchronization signal blocks with the same synchronization signal block index.

* * * * *